(12) United States Patent
Ding et al.

(10) Patent No.: US 11,591,918 B2
(45) Date of Patent: Feb. 28, 2023

(54) ARTICLE WITH CERAMIC BARRIER COATING AND LAYER OF NETWORKED CERAMIC NANOFIBERS

(71) Applicant: United Technologies Corporation, Farmington, CT (US)

(72) Inventors: Zhongfen Ding, South Windsor, CT (US); Elisa M. Zaleski, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1057 days.

(21) Appl. No.: 16/270,680

(22) Filed: Feb. 8, 2019

(65) Prior Publication Data

US 2020/0256200 A1 Aug. 13, 2020

(51) Int. Cl.
*F01D 5/28* (2006.01)
*C04B 35/48* (2006.01)
(Continued)

(52) U.S. Cl.
CPC .............. *F01D 5/288* (2013.01); *C04B 35/48* (2013.01); *C04B 35/6225* (2013.01); *C04B 35/62222* (2013.01); *C23C 28/3215* (2013.01); *C23C 28/3455* (2013.01); *F01D 5/284* (2013.01); *C04B 2235/3244* (2013.01); *C04B 2235/3246* (2013.01); *C04B 2235/3248* (2013.01); *C04B 2235/5236* (2013.01); *C04B 2235/5264* (2013.01); *C23C 30/00* (2013.01); *F05D 2220/32* (2013.01); *F05D 2230/90* (2013.01);
(Continued)

(58) Field of Classification Search
CPC . C04B 41/52–526; C04B 41/85; C04B 41/87; C04B 41/89; C23C 28/30; C23C 28/32–3215; C23C 28/34; C23C 28/345; C23C 28/3455; F05D 2230/90; F05D 2300/611; F05D 2300/6111; F01D 5/288
See application file for complete search history.

(56) References Cited

U.S. PATENT DOCUMENTS 7,704,049 B1 * 4/2010 Liang ...................... F01D 5/183
428/116
8,221,825 B2 7/2012 Reitz et al.
(Continued)

FOREIGN PATENT DOCUMENTS

CN 108754495 11/2018
EP 2851513 A1 * 3/2015 ............. C04B 35/00
(Continued)

OTHER PUBLICATIONS

European Search Report for European Patent Application No. 20156445.7 completed May 8, 2020.
(Continued)

*Primary Examiner* — Z. Jim Yang
(74) *Attorney, Agent, or Firm* — Carlson, Gaskey & Olds, P.C.

(57) ABSTRACT

An article includes a substrate, a ceramic barrier coating, and a layer of networked ceramic nanofibers. The ceramic barrier coating is disposed on the substrate and has a porous columnar microstructure. The layer of networked ceramic nanofibers is disposed on the ceramic barrier layer and seals the pores of the porous columnar microstructure.

14 Claims, 3 Drawing Sheets

(51) Int. Cl.
  *C04B 35/622* (2006.01)
  *C23C 28/00* (2006.01)
  *C23C 30/00* (2006.01)

(52) U.S. Cl.
  CPC .. *F05D 2240/24* (2013.01); *F05D 2300/2118* (2013.01); *F05D 2300/5023* (2013.01); *F05D 2300/614* (2013.01)

(56) References Cited

U.S. PATENT DOCUMENTS

| | | | |
|---|---|---|---|
| 8,272,843 B1* | 9/2012 | Ryznic | F01D 5/288 416/241 A |
| 8,821,116 B2 | 9/2014 | Duval et al. | |
| 2004/0191544 A1* | 9/2004 | Bast | C23C 28/04 427/446 |
| 2006/0019087 A1* | 1/2006 | Mazzola | C04B 41/85 428/323 |
| 2006/0024528 A1* | 2/2006 | Strangman | C04B 41/89 428/701 |
| 2009/0017260 A1 | 1/2009 | Kulkarni et al. | |
| 2009/0060747 A1* | 3/2009 | Strock | C04B 37/021 29/889.22 |
| 2010/0129673 A1* | 5/2010 | Lee | C04B 41/87 428/446 |
| 2012/0240369 A1 | 9/2012 | Capparelli Mattoso et al. | |
| 2012/0276352 A1* | 11/2012 | Liu | F01D 5/288 428/312.8 |
| 2013/0260130 A1* | 10/2013 | Taxacher | C23C 28/341 106/482 |
| 2015/0197456 A1* | 7/2015 | Oboodi | F01D 5/288 427/446 |
| 2016/0010471 A1* | 1/2016 | Pabla | F02C 7/25 428/323 |
| 2017/0321559 A1* | 11/2017 | Chapman | C23C 30/00 |
| 2019/0256983 A1* | 8/2019 | Joulia | C04B 41/5042 |
| 2020/0230645 A1* | 7/2020 | Overholser | C23C 18/1212 |
| 2020/0256562 A1* | 8/2020 | Ding | C04B 35/48 |

FOREIGN PATENT DOCUMENTS

| | | | | |
|---|---|---|---|---|
| EP | 2857637 A1 * | 4/2015 | | F01D 5/288 |
| JP | 2011167994 A * | 9/2011 | | C04B 35/00 |
| KR | 20170122883 | 11/2017 | | |
| WO | WO-2017142572 A1 * | 8/2017 | | B22C 7/02 |
| WO | WO-2019040079 A1 * | 2/2019 | | B22C 7/02 |

OTHER PUBLICATIONS

Wang, H., Zhang, X., Wang, N., Li, Y., Feng, X., Huang, Y., and Zhao, C. et al. (2017). Ultralight, scalable, and high-temperature-resilient ceramic nanofiber sponges. Science Advances. Issue 3. Jun. 2, 2017.

* cited by examiner

ARTICLE WITH CERAMIC BARRIER COATING AND LAYER OF NETWORKED CERAMIC NANOFIBERS

BACKGROUND

Gas turbine engine components in the core gaspath may be subject to temperatures in excess of the melting temperature of the component substrate. Cooling features and barrier coatings are used to protect the substrate from these extreme temperatures. Barrier coatings are typically formed of ceramic materials, such as yttria stabilized zirconia or gadolinium zirconate. A thermally grown oxide layer is provided on the substrate as a bond coat to enhance bonding of the barrier layer on the substrate.

SUMMARY

An article according to an example of the present disclosure includes a substrate, and a ceramic barrier coating disposed on the substrate. The ceramic barrier coating has a porous columnar microstructure, and a layer of networked ceramic nanofibers is disposed on the ceramic barrier layer. The nanofibers seal the pores of the porous columnar microstructure.

In a further embodiment of any of the foregoing embodiments, the ceramic nanofibers include zirconium oxide.

In a further embodiment of any of the foregoing embodiments, the ceramic nanofibers are selected from the group consisting of yttria stabilized zirconia, gadolinia zirconate, and combinations thereof.

In a further embodiment of any of the foregoing embodiments, the ceramic barrier coating includes zirconium oxide.

In a further embodiment of any of the foregoing embodiments, the ceramic barrier coating is selected from the group consisting of yttria stabilized zirconia, gadolinia zirconate, and combinations thereof.

In a further embodiment of any of the foregoing embodiments, the substrate is a metal alloy.

In a further embodiment of any of the foregoing embodiments, the layer has a thickness of 1 micrometer to 50 micrometers.

In a further embodiment of any of the foregoing embodiments, the thickness is from 1 micrometer to 5 micrometers.

In a further embodiment of any of the foregoing embodiments, the ceramic barrier coating has a thickness t1 and the layer has a thickness t2, and t2 is less than t1 by a factor of at least 5.

In a further embodiment of any of the foregoing embodiments, the ceramic nanofibers of the layer extend into the pores of the porous columnar microstructure.

A further embodiment of any of the foregoing embodiments includes an additional ceramic barrier coating disposed on the layer of the networked ceramic nanofibers.

In a further embodiment of any of the foregoing embodiments, the additional ceramic barrier coating includes zirconia stabilized with an element selected from the group consisting of cesium, titanium, and combinations thereof.

In a further embodiment of any of the foregoing embodiments, the ceramic nanofibers and the ceramic barrier coating are independently selected from the group consisting of yttria stabilized zirconia, gadolinia zirconate, and combinations thereof, and the layer has a thickness of 1 micrometer to 5 micrometers.

An airfoil according to an example of the present disclosure includes an airfoil section, a porous barrier coating disposed on the airfoil section, and a layer of networked ceramic nanofibers disposed on the porous barrier coating. The nanofibers seal the pores of the porous barrier coating.

In a further embodiment of any of the foregoing embodiments, the porous barrier coating has a porous columnar microstructure.

In a further embodiment of any of the foregoing embodiments, the ceramic nanofibers include zirconium oxide.

In a further embodiment of any of the foregoing embodiments, the ceramic nanofibers are selected from the group consisting of yttria stabilized zirconia, gadolinia zirconate, and combinations thereof.

A further embodiment of any of the foregoing embodiment includes an additional ceramic barrier coating disposed on the layer of the networked ceramic nanofibers.

In a further embodiment of any of the foregoing embodiments, the additional ceramic barrier coating includes zirconia stabilized with an element selected from the group consisting of cesium, titanium, and combinations thereof, and the layer has a thickness of 1 micrometer to 5 micrometers.

A method of fabricating an article according to an example of the present disclosure includes providing a substrate and a ceramic barrier coating disposed on the substrate. The ceramic barrier coating has a porous columnar microstructure. A layer of networked ceramic nanofibers is deposited by blow-spinning on the ceramic barrier layer to seal the pores of the porous columnar microstructure.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
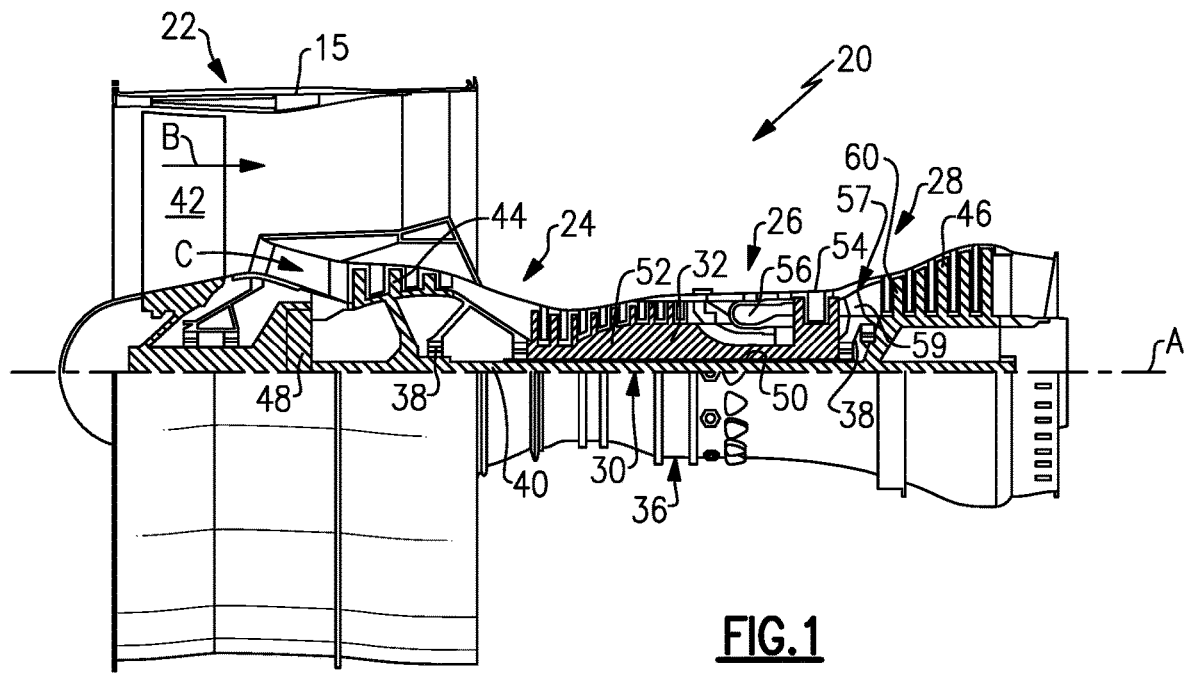
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{\wedge}0.5$. The "Low corrected fan tip speed" as disclosed herein according to one non-limiting embodiment is less than about 1150 ft/second (350.5 meters/second).

Figure 2:
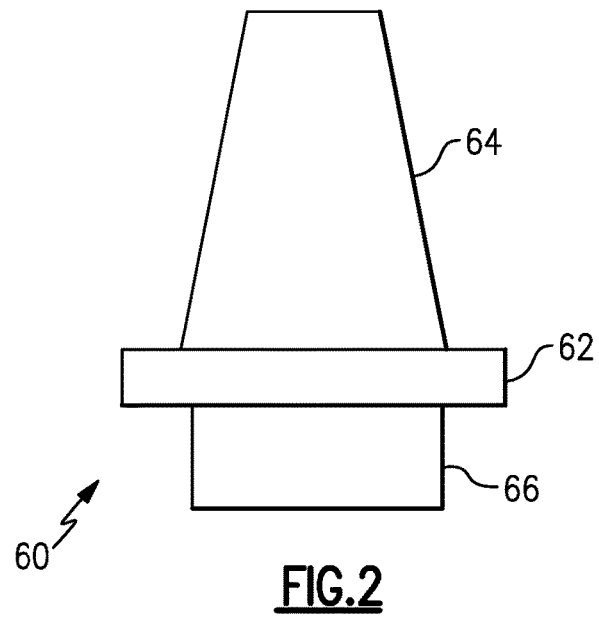
FIG. 2 illustrates an example article that has a layer of networked ceramic nanofibers.

FIG. 2 illustrates an example article 60. In this example, the article 60 is a rotatable turbine blade of the engine 20 (see also FIG. 1). It is to be understood that, although the examples herein may be described with reference to the turbine blade, this disclosure is also applicable to static turbine vanes, seals, combustors, or other gas turbine engine components.

The turbine blade generally includes a platform 62, an airfoil section 64 that extends from the platform 62, and a root 66. The article 60 is subjected during use to extreme temperatures in the engine 20. As described below, the article 60 includes a coating system to protect against the high temperatures and environmental effects that might otherwise damage the article 60.

Figure 3:
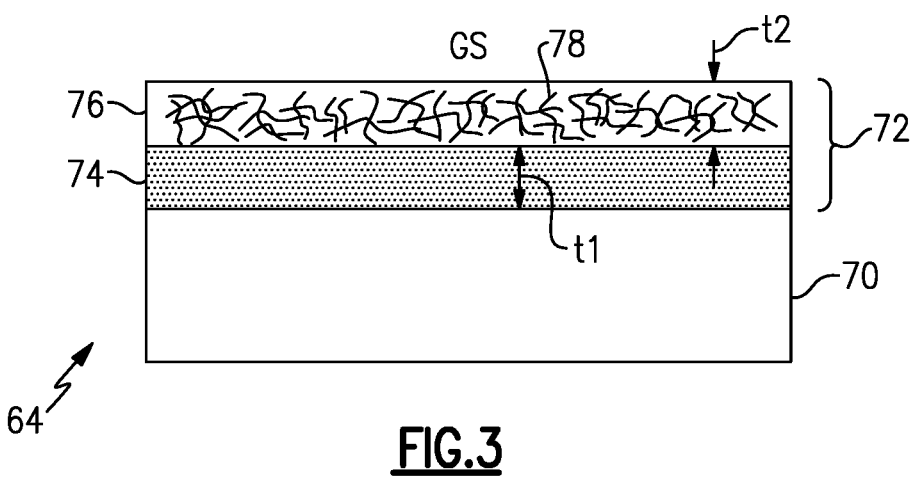
FIG. 3 illustrates a sectioned view of a representative portion of the article of FIG. 2.

FIG. 3 illustrates a sectioned view through a representative portion of the airfoil section 64, although the example could also apply to the platform 62, root 66, or other thermally-exposed portion if the article 60 is not a blade. The view is a section through an outer wall, in which the gaspath side is represented at GS. The wall is formed of a substrate 70. Most typically, the substrate 70 will be formed of a superalloy, such as a nickel- or cobalt-based alloy. Alternatively, the substrate 70 may be formed of a ceramic or ceramic composite material.

There is a conformal coating system 72 disposed on the gaspath side of the substrate 70. In this example, the coating system 72 includes a porous barrier coating 74 disposed on the substrate 70. As an example, the porous barrier coating 74 is formed primarily of zirconium oxide. For instance, the zirconium oxide may be a stabilized or partially stabilized zirconia, such as yttrium stabilized zirconia or gadolinia stabilized zirconia, or a zirconate that is doped with a rare earth stabilizer, such as yttria or gadolinia. The porous barrier coating 74 may, for example, be deposited by plasma spray or physical vapor deposition, which generally result in a porous structure. Optionally, a bond layer may be utilized between the barrier coating 74 and the substrate 70, to promote bonding and resist spallation.

Figure 4:
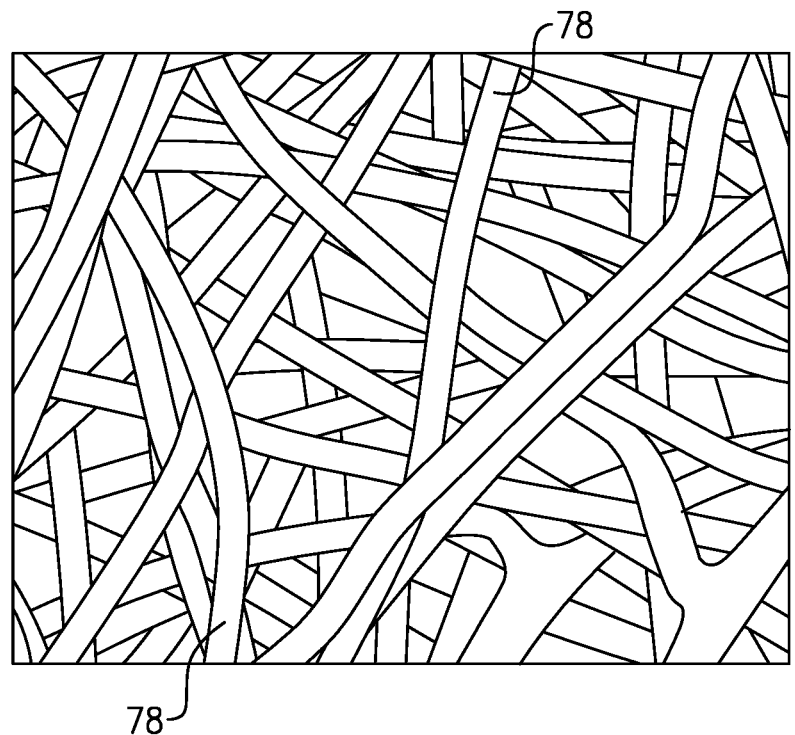
FIG. 4 illustrates a magnified view of networked ceramic nanofibers.

A layer 76 of networked ceramic nanofibers 78 is disposed on the porous barrier coating 74. FIG. 4 illustrates a magnified view of the networked ceramic nanofibers 78. The nanofibers 78 are elongated, randomly oriented filaments that have a maximum diameter of 1 nanometer to 500 nanometers. More typically, the diameter will be 1 nanometer to 250 nanometers, 1 nanometer to 100 nanometers, or 1 nanometer to 50 nanometers. The filaments are non-linear and curve or turn such that the filaments are intertwined to form a tangled porous network. As used herein, "networked" refers to the intertwining of the fibers or filaments. Where the filaments contact each other, they may be bonded together as a result of the process used to form the layer 76.

The nanofibers 78 are formed of a ceramic, such as an oxide. In one example, the ceramic is zirconium oxide. For instance, the zirconium oxide may be a stabilized or partially stabilized zirconia, such as yttrium stabilized zirconia or gadolinia stabilized zirconia, or a zirconate that is doped with a rare earth stabilizer, such as yttria or gadolinia.

The layer 76 of networked ceramic nanofibers 78 seals the pores of the porous barrier coating 74. For instance, although the layer 76 of networked ceramic nanofibers 78 is itself porous, the networked ceramic nanofibers 78 provide a sponge-like structure of smaller pores that provides superior thermal insulation. Therefore, the layer 76 of networked ceramic nanofibers 78, even if formed of the same composition as the porous barrier coating 74, provides thermal sealing of the porous barrier coating 74. As an example based on zirconia, the layer 76 of networked ceramic nanofibers 78 may have a thermal conductivity of approximately 0.027 Watts per meter-Kelvin.

Additionally, the pores of the layer 76 of networked ceramic nanofibers 78 are much smaller than the pores of the porous barrier coating. Therefore, the layer 76 of networked ceramic nanofibers 78 serves to block debris or foreign material (e.g., calcium-magnesium-aluminosilicate or "CMAS") that might otherwise infiltrate into the pores of the porous barrier coating 74 and cause damage, thereby sealing the porous barrier coating 74. The filaments of the networked ceramic nanofibers 78 are also flexible and strain tolerant. The flexibility of the filaments may further facilitate entrapment of foreign particles, debris, or materials, as well as act as "bumper" to absorb impact of particles and debris. The layer 76 of networked ceramic nanofibers 78 thereby provides thermal and physical sealing/protection.

It is further noted that networked ceramic nanofibers are not known for being produced on barrier coatings. Rather, networked ceramic nanofibers have been produced in a screen-like cage structure. As a result, use of a layer of networked ceramic nanofibers barrier coating has not been suggested in combination with a thermal barrier coating, nor have the thermal and physical sealing benefits of a layer of ceramic nanofibers been realized for protection of a substrate and thermal barrier coating.

Figure 5:
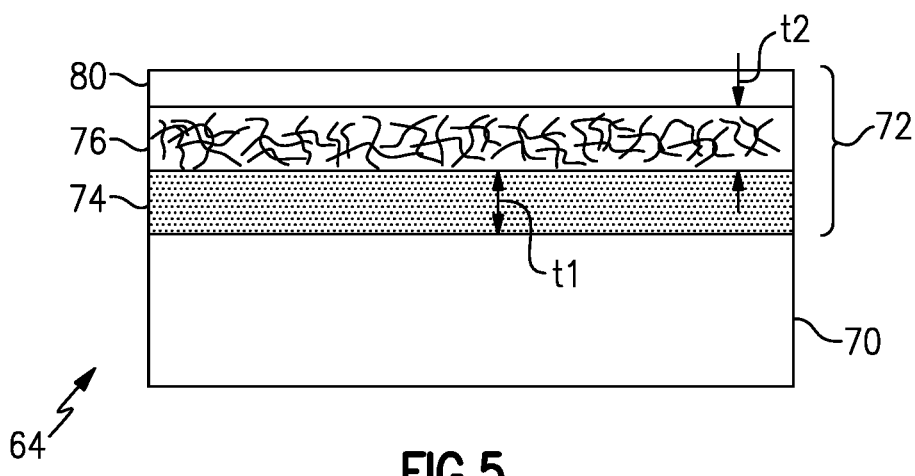
FIG. 5 illustrates a further example with an additional barrier layer.

FIG. 5 illustrates a further example in which the coating system 72 includes an additional barrier coating 80 disposed on the layer 76 of networked ceramic nanofibers 78. The barrier coating 80 may be selected to provide additional protection of the article 60, such as additional resistance to CMAS. In one example, the barrier coating 80 is formed of zirconate stabilized with an element selected from the group consisting of cesium, titanium, and combinations thereof.

Figure 6:
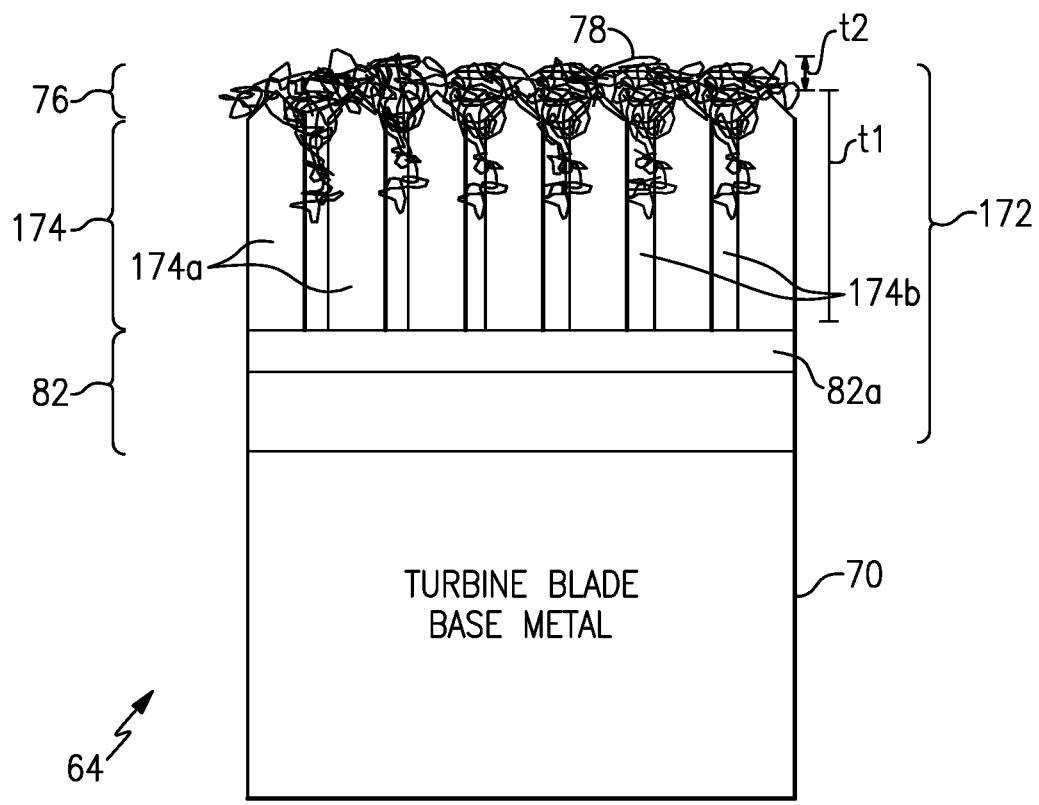
FIG. 6 illustrates an example with a barrier coating having a columnar microstructure.

FIG. 6 illustrates an additional example coating system 172 on the substrate 70. In this disclosure, like reference numerals designate like elements where appropriate and reference numerals with the addition of one-hundred or multiples thereof designate modified elements that are understood to incorporate the same features and benefits of the corresponding elements. In this example, the coating system 172 includes a bond layer 82 and a ceramic barrier coating 174 disposed on the substrate 70. The bond layer 82 may be MCrAlY, where M is nickel, iron or cobalt, Cr is chromium, Al is aluminum, and Y is yttrium. A portion 82a of the bond layer 82 may oxidize to form a thermally grown oxide scale, which facilitates bonding of the ceramic barrier coating 174.

Like the coating 74, the ceramic barrier coating 174 may include zirconium oxide. The zirconium oxide may be a stabilized or partially stabilized zirconia, such as yttrium stabilized zirconia or gadolinia stabilized zirconia, or a zirconate that is doped with a rare earth stabilizer, such as yttria or gadolinia. The ceramic barrier coating 174, however, has a columnar microstructure, represented schematically by microstructural columns 174a. Such a columnar microstructure is a result of fabrication by electron beam physical vapor deposition. The columns 174 are substantially perpendicular to the bond layer 82 and substrate 70. There are pores 174b defined by the gaps between the columns 174a. Such a columnar microstructure facilitates coating durability. The pores 174b, however, may be prone to infiltration of debris and other material that could damage the coating 174 or underlying substrate 70. In particular, since the pores are also substantially perpendicular to the bond layer 82 and substrate 70, they can provide a direct path of infiltration for CMAS and foreign material. In this regard, the layer 76 of networked ceramic nanofibers 78 seals the pores 174b. As an example, the networked ceramic nanofibers 78 may infiltrate partially into the pores 174b during fabrication, thereby further enhancing sealing.

Due to the thermal insulation and sealing provided by the layer 76 of networked ceramic nanofibers 78, the barrier coating 74/174 can be made thinner than it would be without the layer 76 of networked ceramic nanofibers 78, yet achieve similar overall performance Use of thinner barrier coating 74/174 may also benefit rigidity and adhesion, while also lowering weight and reducing fabrication time.

In any of the above examples, the layer 76 of networked ceramic nanofibers 78 may have a thickness of 1 micrometer to 50 micrometers. Most typically, however, the thickness will be from 1 micrometer to 5 micrometers. The thickness is less than the thickness of the barrier coating 74/174. For instance, the barrier coating 74/174 may have a thickness t1 and the layer 76 of networked ceramic nanofibers 78 may have a thickness t2, where t2 is less than t1 by a factor of at least 5. Most typically, the barrier coating 74/174 will have a thickness of approximately 100 micrometers to 500 micrometers, or approximately 250 micrometers. The thickness of the layer 76 of networked ceramic nanofibers 78 may be adjusted to control the thermal and physical sealing described above.

The layer 76 of networked ceramic nanofibers 78 may be fabricated directly on to the barrier coating 74/174. For example, the process may include first providing the substrate 70 and barrier coating 74/174. For instance, the substrate 70 may be formed in a prior process and the barrier coating 74/174 deposited thereon prior to the application of the layer 76. The layer 76 of networked ceramic nanofibers 78 may then be deposited by a blow-spinning process. Blow-spinning involves spraying a precursor solution through an inner nozzle while flowing a process gas from an outer concentric nozzle such that the precursor when sprayed elongates into ultra-thin filaments. The filaments deposit on the carrier coating 74/174 and, after further processing, are converted into the ceramic nanofibers. The precursor solution includes binders and salts of the constituents that will form the ceramic, such as zirconium, oxygen, and any dopants. An example binder includes polyvinylpyrrolidone, and example salts may include aqueous oxynitrate, nitrate, nitrite, or chloride salts of zirconium and the selected dopants, zirconyl chloride, or metal organics such as zirconium isobutoxide or isopropoxide in a solvent. The amounts of the constituents may be controlled in order to control the final composition of the ceramic nanofibers. After spinning, the filaments are then thermally treated to remove binders, etc. and consolidate the ceramic. It is during the thermal treatment that the filaments may diffuse and thereby bond together where they are in contact.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
    a substrate;
    a ceramic barrier coating disposed on the substrate, the ceramic barrier coating having a porous columnar microstructure; and
    a layer of networked ceramic nanofibers disposed on the ceramic barrier coating and sealing the pores of the porous columnar microstructure, the ceramic nanofibers are selected from the group consisting of yttria stabilized zirconia, gadolinia zirconate, zirconium oxide, and combinations thereof, and the layer of networked ceramic nanofibers includes filaments that are randomly oriented in the pores of the porous columnar microstructure.

2. The article as recited in claim 1, wherein the substrate is a metal alloy.

3. The article as recited in claim 1, wherein the layer has a thickness of 1 micrometer to 50 micrometers.

4. The article as recited in claim 3, wherein the thickness is from 1 micrometer to 5 micrometers.

5. The article as recited in claim 1, wherein the ceramic barrier coating has a thickness t1 and the layer has a thickness t2, and t2 is less than t1 by a factor of at least 5.

6. The article as recited in claim 1, further comprising an additional ceramic barrier coating disposed on the layer of the networked ceramic nanofibers.

7. The article as recited in claim 6, wherein the additional ceramic barrier coating includes zirconia stabilized with an element selected from the group consisting of cesium, titanium, and combinations thereof.

8. The article as recited in claim 1, wherein the ceramic nanofibers are yttria stabilized zirconia.

9. The article as recited in claim 1, wherein the ceramic nanofibers are gadolinia zirconate.

10. The article as recited in claim 1, wherein the ceramic nanofibers are intertwined.

11. An airfoil comprising:
    An airfoil section;
    a porous ceramic barrier coating disposed on the airfoil section, the porous ceramic barrier coating having a porous columnar microstructure; and
    a layer of networked ceramic nanofibers disposed on the porous ceramic barrier coating and sealing the pores of the porous ceramic barrier coating, the ceramic nanofibers are selected from the group consisting of yttria stabilized zirconia, gadolinia zirconate, zirconium oxide, and combinations thereof, and the layer of networked ceramic nanofibers includes filaments that are randomly oriented in the pores of the porous columnar microstructure.

12. The airfoil as recited in claim 11, further comprising an additional ceramic barrier coating disposed on the layer of the networked ceramic nanofibers.

13. The airfoil as recited in claim 12, wherein the additional ceramic barrier coating includes zirconia stabilized with an element selected from the group consisting of cesium, titanium, and combinations thereof, and the layer has a thickness of 1 micrometer to 5 micrometers.

14. A method of fabricating an article, the method comprising:
    providing a substrate and a ceramic barrier coating disposed on the substrate, the ceramic barrier coating having a porous columnar microstructure; and
    depositing by blow-spinning a layer of networked ceramic nanofibers on the ceramic barrier coating to seal the pores of the porous columnar microstructure, the ceramic nanofibers are selected from the group consisting of yttria stabilized zirconia, gadolinia zirconate, zirconium oxide, and combinations thereof, and the layer of networked ceramic nanofibers includes filaments that are randomly oriented in the pores of the porous columnar microstructure.

* * * * *